United States Patent [19]

Cloran et al.

[11] 4,009,233

[45] Feb. 22, 1977

[54] METHOD FOR PRODUCING ALLOY PARTICLES

[75] Inventors: Thomas S. Cloran, East Liverpool, Ohio; Vernon R. Thompson, Greentree; Russell C. Buehl, Brighton Township, Beaver County, both of Pa.

[73] Assignee: Crucible Inc., Pittsburgh, Pa.

[22] Filed: Apr. 27, 1976

[21] Appl. No.: 680,645

Related U.S. Application Data

[63] Continuation-in-part of Ser. No. 473,110, May 24, 1974, abandoned.

[52] U.S. Cl. .................................. 264/10; 264/82
[51] Int. Cl.² ........................................... B01J 2/02
[58] Field of Search ........................... 264/10; 1/82

[56] References Cited

UNITED STATES PATENTS

| 3,021,562 | 2/1962 | Chisholm et al. | 264/10 |
| 3,275,787 | 10/1966 | Newberry | 264/10 |

*Primary Examiner*—Robert F. White
*Assistant Examiner*—James R. Hall

[57] ABSTRACT

A method for producing metal and alloy particles from an article thereof wherein the article is first diffused with a source of gas, such as hydrogen, and then subjected to localized heating to melting temperature. Upon localized melting the diffused gas within the article is liberated to produce an atomizing effect upon the melted material. This atomized material is then cooled sufficiently rapidly to form discrete particles which are then collected for further use, such as in powder metallurgy applications.

3 Claims, 3 Drawing Figures

METHOD FOR PRODUCING ALLOY PARTICLES

This application is a continuation-in-part of application Ser. No. 473,110, filed May 24, 1974 now abandoned.

In forming various articles of intricate configuration from alloys, it is known for the purpose to use various powder metallurgy techniques. Powder metallurgy provides many advantages over casting techniques for producing articles of this type. For example, with articles of intricate configuration when produced from a casting the casting invariably must be subjected to various forming, machining and polishing operations to achieve the desired final product configuration. In contrast, with powder metallurgy techniques a particle charge of the alloy from which the article is to be produced may be compacted to a shape corresponding substantially to that desired in the final product, and then subjected to final machining and polishing operations. For articles of this type which are required for use as aircraft engine components and the like, it is required that they be made from a material that will have a high strength to weight ratio. Although various materials are used for this purpose, such as cobalt- and nickel-base superalloys depending upon the particular application, in aircraft engine and similar applications it is customary to use titanium-base alloys. As is well known, alloys of this type are highly reactive in the molten state and accordingly must be refined in a nonoxidizing atmosphere. Typically, alloys of this type are refined by the well-known consumable electrode melting techniques wherein an electrode is arc melted in an inert atmosphere to form an ingot. For purposes of powder metallurgy applications, therefore, it is impossible to satisfactorily form the desired particles of titanium-base alloys by the well-known techniques of gas or liquid atomizing a molten stream of the alloy to form discrete droplets which are then quickly cooled to form particles which constitute the powder charge. Although various mechanical techniques have been employed for the purpose wherein particles are mechanically removed from a solid article of the alloy, invariably these techniques result in the mechanical means used for removal contaminating the resulting particles. In addition, with mechanical arrangements it is difficult to achieve the desired rounded or spherical particle shape which is required in many powder metallurgy applications. Likewise, with techniques where a solid article of the desired titanium-base alloy is melted in an inert atmosphere, such as by an arc-melting technique, it is difficult to achieve separation of the melted material into the discrete droplets required for powder metallurgy applications and yet prevent agglomeration thereof while insuring that the melted material and resulting particles are maintained free from contamination and in a nonoxidizing environment.

It is accordingly a primary object of the present invention to provide a method for melting alloys of reactive metal, and particularly titanium-base alloys, and forming discrete particles from the melted alloy which particles are of the desired fine particle size for powder metallurgy applications and are maintained free from oxidation and contamination during the required atomization of the alloy while in the molten state.

An additional, more specific, object of the invention is to provide a method for atomizing molten titanium-base alloys in a nonoxidizing atmosphere to form discrete particles thereof of the desired fine particle size without causing contamination thereof.

These and other objects of the invention, as well as a complete understanding thereof, may be obtained from the following description, specific examples and drawings, in which.

Figure 1:
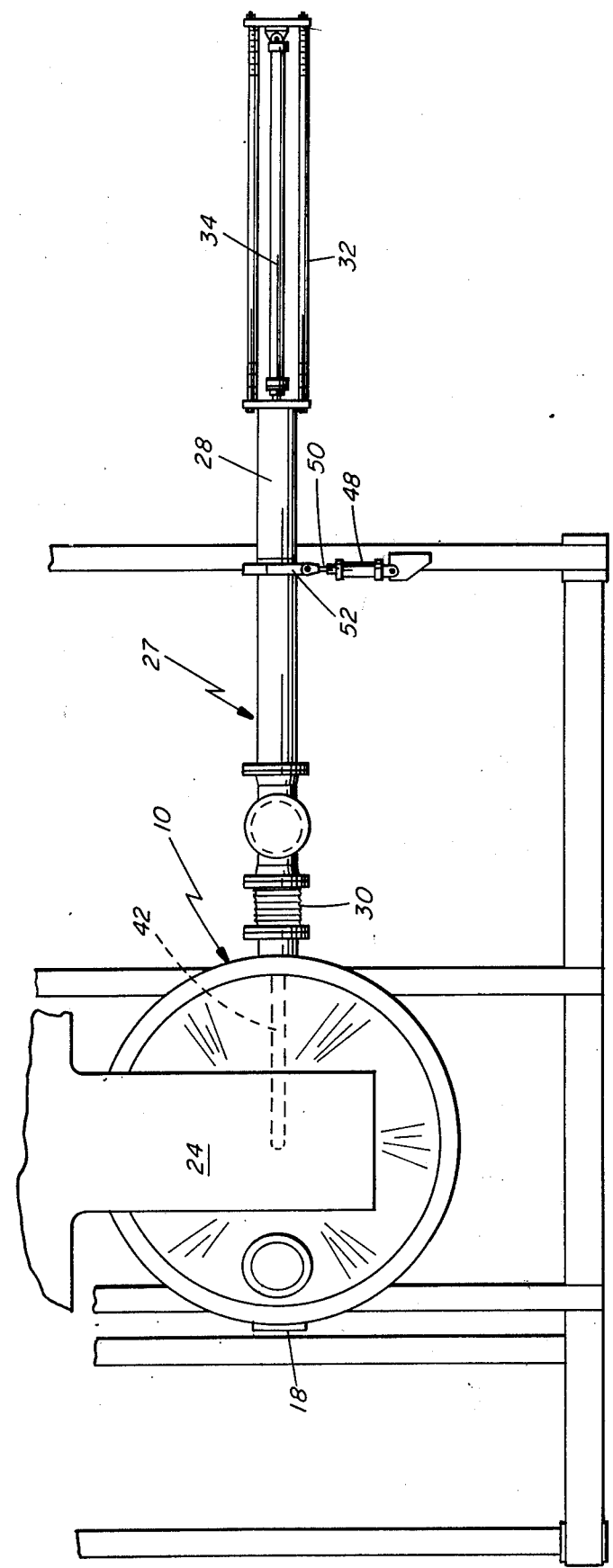
FIG. 1 is a plan view of one embodiment of an apparatus for carrying out the method of the invention which is particularly adapted for the manufacture of titanium-alloy particles from a solid alloy article in the form of a plate by "electron-beam melting" to produce the required localized heating.

Broadly in the practice of the invention, an article of the metal or alloy from which it is desired to produce the particles, such as an arc melted electrode of a titanium-base alloy, is employed. This article is hydrided by subjecting it to an operation wherein hydrogen gas or hydrides are diffused in the article to produce hydrides therein. This may be achieved by diffusing or dispersing a source of hydrogen gas in the form of hydrides in solid, particle form with particles of the reactive metal or alloy from which the article is to be constructed and compacting or otherwise densifying the particles to form a compacted article. The source of hydrogen gas in solid, particle form would be a hydride, such as titanium hydride in the case of the reactive metal article being titanium or a titanium-base alloy. Hydrogen-gas diffusion through the article may be achieved by any convenient practice. One example of a suitable practice is to place the article in a furnace where, in the case of a titanium-base alloy article, it would be heated in an evacuated furnace chamber and upon reaching a temperature of about 1500° F hydrogen gas would be introduced to the chamber for a period sufficient to achieve the desired diffusion. Typically, the titanium article so hydrided would have a hydrogen content of approximately 1% by weight. However, depending upon particular process variables, and particularly the degree of atomization required, the hydrogen content of the hydrided portion of the article might vary within the range of 0.5 to 3% by weight and could be as low as 0.05% by weight. Although it is necessary that the hydrogen be diffused within the article the diffusion need not necessarily be throughout the entire cross section and certainly will not be uniform as the amount will decrease from the surface to the center of the article mass. As alternate practice for hydrogen-gas diffusion to hydride the reactive metal article is to perform this operation in the same chamber as the subsequent localized heating operation, which is described in detail hereinafter, is performed. In this alternate practice the article would be heated to about 1500° F and subjected (while within the chamber in which subsequent localized heating is performed) to hydrogen gas, preferably at a pressure slightly less than atmospheric. After hydriding of the article surface, the chamber is evacuated, as by pumping, to achieve a pressure of for example about 3 mm of Hg. The hydrided surface is then melted from the article by a localized-heating operation described hereinafter.

Upon completion of this melting operation, the article is again subjected to hydrogen-gas diffusion by reintroducing hydrogen gas to the chamber, again preferably at a pressure of slightly less than atmospheric. It is generally, not necessary to additionally heat the article, because the heat absorbed and retained by the article incidental to the localized heating operation is sufficient (about 1500° F) to permit hydriding.

The hydrided titanium article is then subjected to localized heating, such as that resulting from the use of an electron beam heater or vacuum arc melting. The localized heating is sufficient to produce localized melting of the article. Upon localized melting the hydrogen will be liberated from the article to cause immediate atomization of the melted alloy. Rapid cooling of the atomized material results in the formation of discrete particles, which may be collected for use as powder metallurgy charges. Although various forms of localized heat may be used, such as arc melting, electron beam melting and the use of a laser beam, it has been found that electron beam heating is preferred for the purpose. In the case of reactive metals and their alloys, such as titanium-base alloys, it is necessary that the heating be performed in an inert atmosphere. Likewise, the atomized material must be protected from oxidation and contamination during cooling to solidification.

Figure 2:
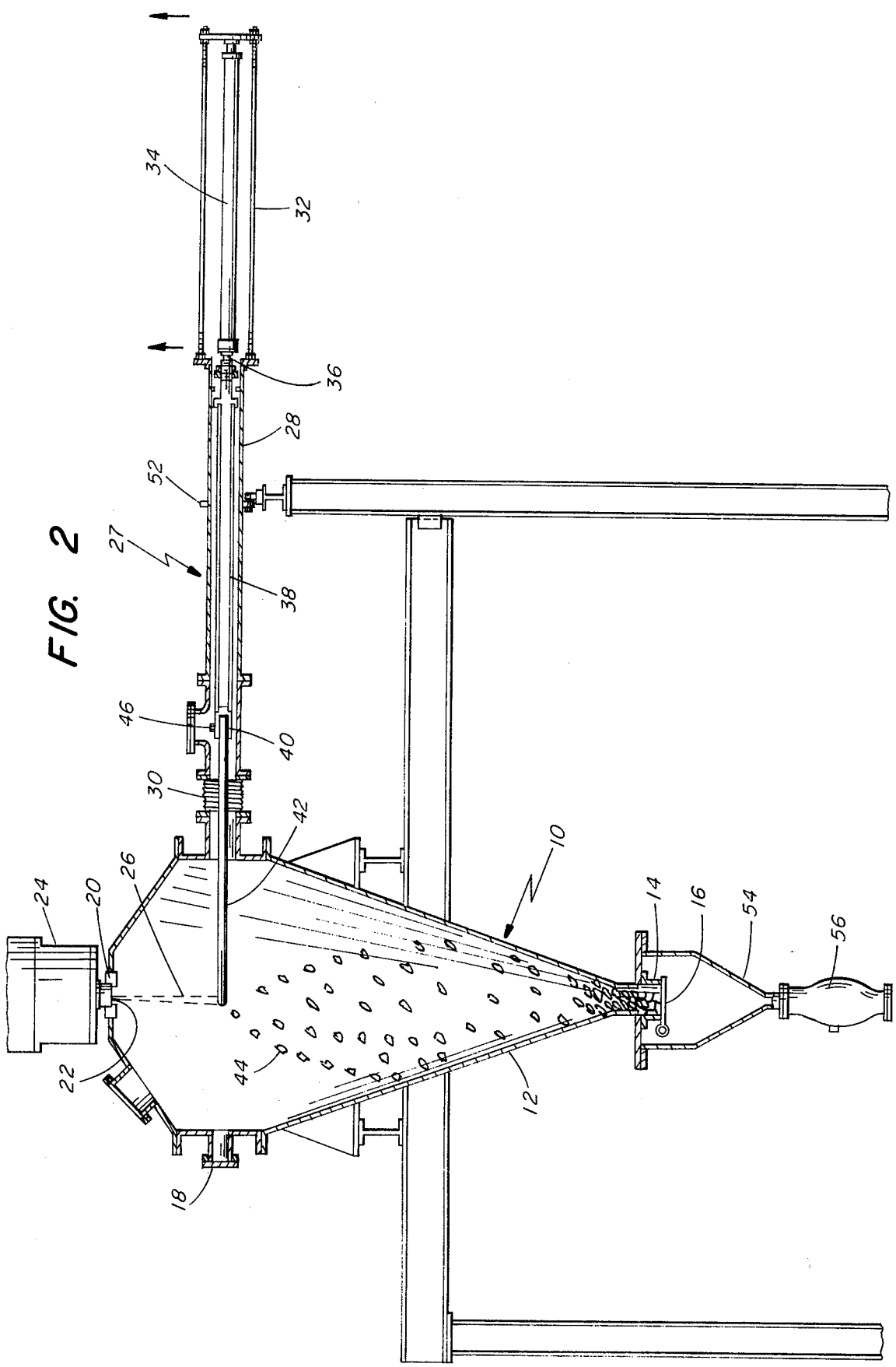
FIG. 2 is a vertical sectional view of the apparatus of FIG. 1.

With respect to the drawings, and particularly FIGS. 1 and 2, there is shown schematically a chamber, designated generally as 10, having a generally coned shape, lower hopper portion 12 which is truncated to form a lowermost opening 14, which may be selectively closed by gate 16. The hopper portion of the chamber is used for collection of the atomized material upon melting and resolidification thereof. The chamber is likewise provided with a vacuum outlet 18, which may be connected to evacuating means (not shown) for maintaining the chamber interior under vacuum during the melting operation. Flexible seal 20 is located in the top of the chamber 10 and defines a sealed opening 22 for positioning of an electron gun 24 with the beam 26 being directed into the chamber 10 through this opening. The chamber is provided with a workpiece feed mechanism, designated generally as 27, to accommodate a slidable workpiece 28, which may be of a titanium-base alloy.

As shown in the drawings, the workpiece feed mechanism 27 includes a tubular housing 28 that openings into the chamber 10 via flexible seal 30. On the end of the housing 28 opposite that communicating with the interior of the chamber there is connected a support 32 for a pneumatic piston cylinder 34 which includes axially movable piston 36 connected to an elongated workpiece holder 38. The holder 38 has at one end thereof a slot 40 into which a workpiece 42, which may be in the form of a rod of titanium alloy of a composition from which it is desired to form particles for use in powder metallurgy applications; particles which in the practice of the invention are produced from this rod are designated as 44. The workpiece 42 is secured within slot 40 by a bolt 46.

As best shown in FIG. 1, a second piston cylinder 48 has piston 50 thereof connected by clamp 52 to tubular housing 28 of workpiece feed mechanism 27. The piston 50 slides axially and normal to the axis of housing 28 to provide for corresponding movement of feed mechanism 27, which is facilitated by flexible seal 30.

Enclosing the opening 14 in the bottom of chamber 10 is a particle-collecting vessel 54 to the bottom of which is connected a particle-discharge valve 56.

Figure 3:
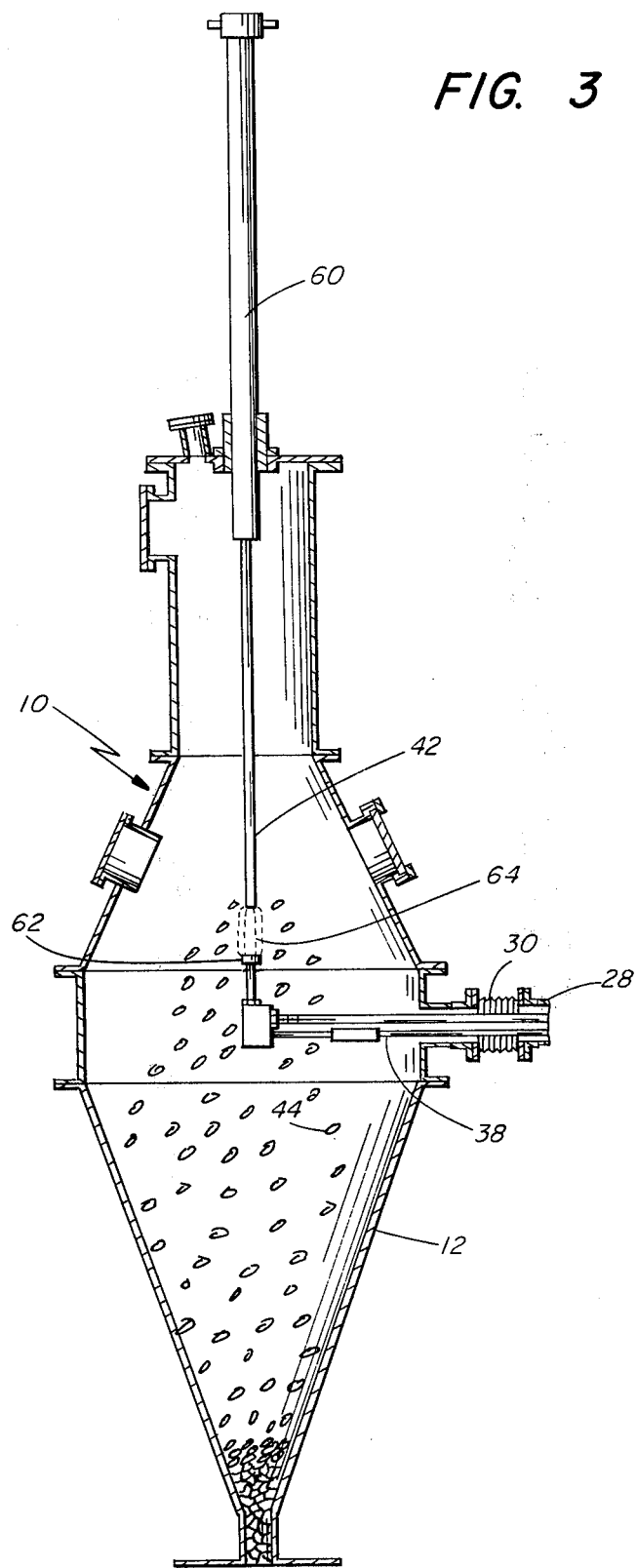
FIG. 3 is a vertical sectional view of the alternate embodiment of an apparatus used with the method of the invention which is particularly adapted for the manufacture of titanium-alloy particles from a solid alloy article in the form of a rod by "arc melting" to produce the required localized heating.

The alternate apparatus shown in FIG. 3 is substantially the same as that shown in and described in relation to FIGS. 1 and 2, except that this apparatus has been modified to permit localized heating and melting of the workpiece by means of vacuum arc melting instead of by the use of an electron beam. For this purpose an electrode support 60 extends through opening 22 in the top of chamber 10 and into the interior of the chamber. The workpiece 42 to be melted which in this embodiment of the invention is in the form of a rod, is connected to and extends from an end of support 60 to approximately the midpoint of the chamber. The movable elongated workpiece holder 38, which was shown and described with respect to FIGS. 1 and 2 movably supports either a consumable or nonconsumable electrode 62 within chamber 10 and immediately beneath workpiece 42. Suitable electrical connections (not shown) are associated with workpiece 38 and a nonconsumable electrode 62 and the distance therebetween is adjusted to permit an arc 64 to be produced between the end of the workpiece and the nonconsumable electrode.

With the apparatus as shown and described with respect to FIGS. 1 and 2 upon energization of the electron gun 24 the electron beam 26 therefrom is directed onto the end of electrode 42 to cause melting of that portion of the electrode contacted by the beam. With the electrode being of a hydrided titanium-base alloy, as described hereinabove, upon melting of the material the hydrogen gas diffused through the electrode is simultaneously liberated to give an atomizing effect to the melted alloy and form discrete molten droplets, which are indicated in the drawing as 44. These droplets, because of their small size rapidly cool to solidification temperature and are collected within the cone shaped portion 12 of the vessel 10, as best shown in FIG. 2. After the melting operation the gate 16 may be opened to permit discharge of the collected particles 32 through opening 14 to the collecting vessel 54. By closing gate 16 and valve 56 the interior of the chamber can be isolated to maintain the vacuum. The particles are collected by maintaining gate 16 closed and then opening valve 56.

As a specific example of the practice of the invention a round titanium alloy bar having a length of 15 inches and a 1¼-inch diameter of the composition 6% aluminum, 4% vanadium and balance titanium was employed to produce particles in accordance with the practice of the invention. This titanium alloy bar was hydrided to achieve the hydrogen content of approximately 1% by weight. Apparatus similar to that shown and described with respect to FIGS. 1 and 2 was employed. The bar was placed in a chamber evacuated to a pressure 60 millimeters of argon and the end of the bar was positioned vertically 7 inches below the orifice of an electron gun. The gun was operated at a beam current of 70 milliamperes and 175 kilovolts on rapid on-off cycle of ½ second interval for approximately 15 to 20 seconds. During this time the electron beam heated the contacted portion of the bar to a temperature of about 1700° C. The material melted from the bar at this temperature was atomized by the hydrogen gas liberated simultaneously with melting and the solidified atomized particles were collected within the chamber.

An additional cycle was run with the only significant change being that the end of the bar was positioned approximately 15 inches from the gun orifice.

Upon the conclusion of the two cycles the resulting particles were collected which constituted 206 gms. This proved to be all of the material melted from the bar which during the cycle had been converted to particles and collected in the chamber. Fifty gms., or 25% of the total powder, was +35 mesh with the remaining 156 gms. being −35 mesh. All of the particles were of generally spherical configuration. Cooling was sufficiently rapid that no substantial agglomeration of the particles occurred prior to solidification.

An additional specific example was performed using arc melting as the means for providing localized heating to a temperature sufficient to produce localized melting of a titanium alloy article from which powder is to be made. The apparatus employed was somewhat similar to that shown and described in reference to FIG. 3 of the drawings. An electrode of the composition 6% aluminum, 4% vanadium and balance titanium having a 1.5-inch diameter and a length of approximately 15 inches was employed. The electrode had been hydrided to provide a hydrogen content of approximately 1% by weight. An arc of 20 volts and 1500 amps was produced between this electrode and a 10-inch diameter forging of a similar alloy composition. During the vacuum arc melting operation approximately 80% of the electrode was melted and 25 to 30% of this melted material was converted to collectible powder. During the melting operation the pressure in the chamber was approximately 15 millimeters of argon and increased to approximately 100 millimeters during the melting cycle which had a duration of approximately 1.5 minutes. The pressure increase within the chamber was caused by hydrogen release during the melting operation. Of the powder collected 29% thereof was −100 mesh, 42% was −35 +100 mesh, and less than 29% was +35 mesh. This experiment was repeated five times with slight variations with respect to voltage, amperes, and feed rates and in each instance the results were similar to that reported above. In this specific example both electrodes were consumed during the arc melting operation. It is anticipated that one of the electrodes could be of a nonconsumable material, such as graphite, in which case the arc melting operation, in the well-known manner, would be performed with a melting of only the titanium-alloy electrode.

The term "titanium" and the term "metal" as used herein is intended to mean and include titanium-base alloys and alloys of other metals, such as cobalt and nickel-base alloys, respectively.

The term "localized melting" as used herein is intended to mean that the portion of the workpiece remaining in an unmelted condition is not heated to a temperature at which significant gas, which may be hydrogen, is liberated so that there is insufficient gas remaining to cause the desired atomizing effect during subsequent melting of that portion of the workpiece.

The term "inert atmosphere" as used herein is intended to mean any atmosphere that is noncontaminating to the reactive metal being processed in accordance with the invention, which would include a vacuum, an inert gas atmosphere and a hydrogen-containing atmosphere.

We claim:

1. A method of producing particles from reactive metal and reactive metal alloy article, comprising:
    a. hydriding at least a surface portion of a reactive metal article under conditions to form a metal hydride therein, said hydrided portion of said article having a hydrogen content of at least 0.05%,
    b. heating said article in an inert atmosphere to a temperature and rate of heating in a localized area thereof to locally melt said hydrided portion of said article and to liberate hydrogen gas from said hydride therein, said gas liberation causing immediate atomization of said melt into droplets thereof,
    c. cooling said droplets at a rate sufficient to form discrete particles thereof while protected from oxidation and contamination, and
    d. collecting said particles.

2. The method of claim 1 wherein said reactive metal is selected from the group consisting of titanium and titanium-base alloy.

3. The method of claim 1 wherein said heating is step b) is performed by an electron beam.

* * * * *